United States Patent
Annamraju et al.

(10) Patent No.: US 11,979,197 B2
(45) Date of Patent: May 7, 2024

(54) AUDIO PAIRING BETWEEN ELECTRONIC DEVICES

(71) Applicant: Google LLC, Mountain View, CA (US)

(72) Inventors: Venu Madhav Annamraju, Telangana (IN); Mrinal Ahlawat, Sunnyvale, CA (US); Aviral Gupta, Telangana (IN)

(73) Assignee: GOOGLE LLC, Mountain View, CA (US)

( * ) Notice: Subject to any disclaimer, the term of this patent is extended or adjusted under 35 U.S.C. 154(b) by 368 days.

(21) Appl. No.: 16/964,827

(22) PCT Filed: Dec. 14, 2018

(86) PCT No.: PCT/US2018/065871
§ 371 (c)(1),
(2) Date: Jul. 24, 2020

(87) PCT Pub. No.: WO2020/122959
PCT Pub. Date: Jun. 18, 2020

(65) Prior Publication Data
US 2021/0328687 A1 Oct. 21, 2021

(51) Int. Cl.
*H04B 11/00* (2006.01)
*H04W 4/80* (2018.01)
(Continued)

(52) U.S. Cl.
CPC .............. *H04B 11/00* (2013.01); *H04W 4/80* (2018.02); *H04W 8/005* (2013.01); *H04W 12/50* (2021.01); *H04L 63/18* (2013.01)

(58) Field of Classification Search
None
See application file for complete search history.

(56) References Cited

U.S. PATENT DOCUMENTS 8,831,680 B2    9/2014  Fa et al.
9,264,817 B2 *  2/2016  Shim ................ H04N 21/44231
(Continued)

FOREIGN PATENT DOCUMENTS

CN      108174459 A    6/2018
EP         2166788     3/2010
(Continued)

OTHER PUBLICATIONS

International Search Report for PCT/US2018/065871, dated Mar. 8, 2019, 2 pages.

*Primary Examiner* — Isam A Alsomiri
*Assistant Examiner* — Vikas Atmakuri
(74) *Attorney, Agent, or Firm* — DORITY & MANNING P.A.

(57) ABSTRACT

For each audio pairing broadcast from an electronic device, reporting broadcasted pairing data including: broadcaster device group, broadcast data element, and broadcaster volume setting. For each reception, reporting received pairing data, including: receiver device group, received data element, and received signal score. Matching each received pairing data with zero or one instances of broadcasted pairing data based on a received data element matching the broadcast data element. For each broadcaster reporting a particular group and volume setting, identifying a received signal score value corresponding to a predetermined percentile of a density distribution of such scores matching broadcasters of the particular group. Determining, for each broadcaster of the group, a volume based on: the received signal score corresponding to the predetermined percentile and a reference received signal score. Transmitting, to each broadcaster of the group, instructions to conform the broadcasting device to the determined volume setting.

20 Claims, 3 Drawing Sheets

(51) Int. Cl.
*H04W 8/00* (2009.01)
*H04W 12/50* (2021.01)
*H04L 9/40* (2022.01)

(56) References Cited

U.S. PATENT DOCUMENTS

| | | | |
|---|---|---|---|
| 9,775,184 B2* | 9/2017 | Lee | H04W 8/005 |
| 11,317,416 B2* | 4/2022 | Gordaychik | H04W 8/22 |
| 2005/0101314 A1* | 5/2005 | Levi | H04L 63/0861 |
| | | | 348/14.02 |
| 2010/0110837 A1* | 5/2010 | Jung | H04B 1/02 |
| | | | 367/137 |
| 2012/0051187 A1* | 3/2012 | Paulson | H04B 1/06 |
| | | | 367/137 |
| 2012/0171963 A1* | 7/2012 | Tsfaty | H04B 11/00 |
| | | | 455/41.3 |
| 2013/0336497 A1 | 12/2013 | Duplan et al. | |
| 2014/0176665 A1* | 6/2014 | Gottlieb | H04L 65/403 |
| | | | 709/204 |
| 2015/0199677 A1* | 7/2015 | Wade | G07F 7/0873 |
| | | | 235/380 |
| 2017/0180350 A1* | 6/2017 | Kaufman | H04W 12/06 |
| 2018/0255429 A1* | 9/2018 | Hazlewood | G10L 25/51 |
| 2019/0028208 A1* | 1/2019 | Abhishek | G10K 9/12 |
| 2023/0224958 A1* | 7/2023 | Lee | H04L 5/0012 |
| | | | 370/329 |

FOREIGN PATENT DOCUMENTS

| | | |
|---|---|---|
| EP | 2930667 | 10/2015 |
| JP | 5953366 B2 | 8/2014 |
| TW | M529230 U | 9/2016 |

* cited by examiner

200

```
┌─────────────────────────────────────────────────────────────────┐
│ For each of a plurality of audio frequency (AF) pairing broadcasts from broadcasting │
│ devices, receiving, as a report from the broadcasting device, pairing broadcast data │
│                    including a broadcast data element                  │
│                                  210                                   │
└─────────────────────────────────────────────────────────────────┘
                                  ↓
┌─────────────────────────────────────────────────────────────────┐
│ For each reception of each AF pairing broadcast at a receiving device, receiving, as a │
│ report from each receiving device, received pairing data including the decoded data │
│              element and an indication of received signal quality              │
│                                  220                                   │
└─────────────────────────────────────────────────────────────────┘
                                  ↓
┌─────────────────────────────────────────────────────────────────┐
│ Matching each instance of the reported received pairing data with zero or one instances │
│                    of the reported pairing broadcast data                    │
│                                  230                                   │
└─────────────────────────────────────────────────────────────────┘
                                  ↓
┌─────────────────────────────────────────────────────────────────┐
│ For each broadcasting device group, identifying a received signal quality value │
│ corresponding to a predetermined percentile of a density distribution of such quality │
│     values of instances matching an instance of broadcast pairing data      │
│                                  240                                   │
└─────────────────────────────────────────────────────────────────┘
                                  ↓
┌─────────────────────────────────────────────────────────────────┐
│ Determining for each broadcast device of the group, a volume setting based on: │
│ received signal quality values corresponding to the predetermined percentile, a │
│              reference received signal quality value              │
│                                  250                                   │
└─────────────────────────────────────────────────────────────────┘
                                  ↓
┌─────────────────────────────────────────────────────────────────┐
│ Transmitting to each broadcasting device of the particular group, instructions to │
│        conform the broadcasting device to the determined volume setting        │
│                                  260                                   │
└─────────────────────────────────────────────────────────────────┘
```

FIG. 2

AUDIO PAIRING BETWEEN ELECTRONIC DEVICES

CROSS REFERENCE TO RELATED APPLICATIONS

This application is based upon and claims the right of priority under 35 U.S.C. § 371 to International Application No. PCT/US2018/065871, titled Audio Pairing Between Electronic Devices," filed on Dec. 14, 2018. Applicant claims priority to and the benefit of each of such applications and incorporates all such applications herein by reference in their entirety.

TECHNICAL FIELD

The technology disclosed herein is related to data communication between computing devices using sound energy. Particular examples relate to pairing two computing devices over a sound channel.

BACKGROUND

In mobile payments, instead of using methods like cash, check, and credit card, a customer can use a mobile phone in cooperation with a merchant electronic device to transfer money or to pay for goods and services. In most places outside the U.S., especially jurisdictions where a landline telecommunications infrastructure is not ubiquitous, more people have mobile phones than have bank accounts. For example, India has a vast non-banking population, many of whom reside in the rural areas and are cut off from access to basic financial services from a trusted source. As of 2012, India had nearly a billion mobile phone customers.

SUMMARY

The technology described herein includes computer implemented methods, computer program products, and systems to configure electronic devices for audio frequency pairing. In some embodiments, for each of a plurality of audio frequency pairing broadcasts from a broadcasting electronic device, the technology receives pairing broadcast data including an indication of a broadcasting device group to which the reporting broadcasting device belongs, a data element included in the pairing broadcast, and an indication of a volume setting of the broadcasting device a as a report from the broadcasting device. For each reception of each audio frequency pairing broadcast at a receiving electronic device, the technology receives, as a report from each receiving device, received pairing data including an indication of a receiving device group to which the reporting receiving device belongs, the received data element, and an indication of received signal quality.

The technology then matches each instance of the reported received pairing data with zero or one instances of the reported pairing broadcast data—based at least in part on at least one received data element matching the data element included in a pairing broadcast. For each particular broadcasting device group having a common indication of volume setting, the technology identifies a received signal quality value corresponding to a predetermined percentile of a density distribution of the received signal quality of instances of received pairing data that have been determined to match an instance of broadcast pairing data.

The technology determines, for each broadcast device of the particular group, a volume setting as a function of the received signal quality value corresponding to the predetermined percentile and a reference received signal quality value. The technology then transmits, to each broadcasting device of the particular group, instructions to conform the broadcasting device to the determined volume setting.

In some embodiments pairing broadcast data further includes a temporal indication of the broadcast comprising a broadcast start time and a broadcast stop time and received pairing data further includes a temporal indication of the broadcast reception. In such embodiments, the data element is a token encoding a plurality of symbols and broadcast repeatedly from the broadcast start time to the broadcast stop time. In such embodiments, determining a volume setting is further a function of the temporal indication of the broadcast and the temporal indication of the broadcast reception and the predetermined percentile of the density distribution is 90%.

In some embodiments of the technology disclosed herein, the broadcasting device group is at least one of: the broadcasting device model, the broadcasting device operating system, the broadcasting device manufacturer. In some embodiments of the technology disclosed herein, reporting pairing data includes logging pairing data for a plurality of pairings and transmitting the logged pairing data. In some embodiments of the technology disclosed herein, determining the volume setting for each broadcast device characterized by the particular indication includes determining, by the server, a change in the volume setting as a percentage corresponding to the percentage difference between the received signal quality value of the predetermined percentile and the reference received signal quality value.

In some embodiments of the technology disclosed herein, the density distribution includes a first predetermined minimum number of instances of received pairing data from each of a second predetermined minimum number of receiving device groups. In some embodiments of the technology disclosed herein, each broadcasting device receiving the instructions from the server, sets its broadcast volume index to conform to the instructions.

These and other aspects, objects, features, and advantages of the technology described herein will become apparent to those having ordinary skill in the art upon consideration of the following detailed description of illustrated examples.

BRIEF DESCRIPTION OF THE DRAWINGS

FIG. 2 is a block diagram illustrating methods to configure electronic devices for audio frequency pairing, in accordance with certain examples.

DETAILED DESCRIPTION OF THE EXAMPLES

Figure 1:
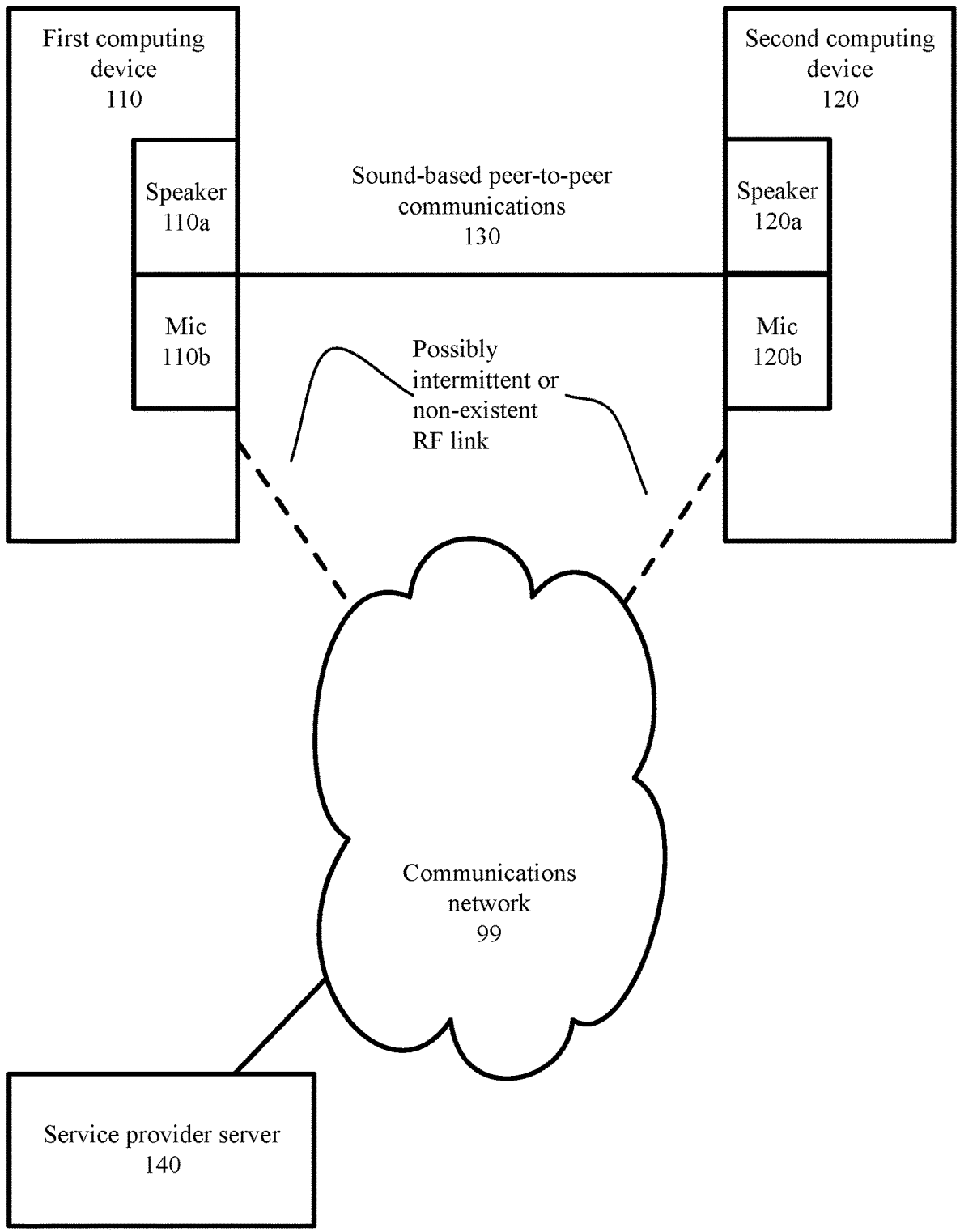
FIG. 1 is a block diagram depicting an operating environment to configure electronic devices for audio frequency pairing, in accordance with certain examples.

While many potential mobile payments users in jurisdictions throughout the world have mobile phones, many of those mobile phones lack radio frequency (RF) communication features, other than via a cellular network that may not always be available. For example, typical mobile payments technologies employ peer-to-peer RF-based technologies such as Near Field Communication (NFC) technology and Personal Area Network (PAN) technology such as BLUETOOTH™ communications technology that are not available on all mobile phones.

Transactions between merchant electronic devices and customer electronic devices in some payment systems can use near-ultrasound audio-based data communication to pair a broadcasting device with one or more receiving devices in close proximity. In some cases, the merchant device and the customer devices are mobile phones without radio frequency pairing capability, while the broadcasting device is the merchant's device and each receiving device is a customer's mobile phone.

Audio broadcasting devices can exhibit a large variation in audio performance owing to design choices by device manufacturers. Consequently, it can be difficult to maintain consistent pairing performance across broadcasting devices from different manufacturers using universal defaults—or, in some cases even across different models, or even operating systems, from the same manufacturer. One such device-dependent configuration is volume setting of the broadcasting device speaker. Setting the volume level of broadcasting devices that use audio as a data channel can be a process specific to broadcasting devices of a certain group due to speaker sensitivities, loudspeaker rating, and other factors which are generally unknown unless measured in lab setting using a known audio receiving device, and fixed distance and orientation between broadcasting device and receiving device.

It is possible to set the volume of broadcasting devices in the lab. However, this effort is difficult to scale to cover all the broadcasting devices across groups sharing common audio characteristics. It is also possible to analyze only audio channel pairings made with a golden receiving device. However, that approach can limit the number of transactions that can be analyzed and may tend to unduly emphasize the effect of the other unknown variables.

Signal characteristics observed at a receiving device during audio data transmission can be a nonlinear function of unknown receiving device gain, distance, orientation, ambient noise, and reverberation during the transaction. Therefore, it can be useful to analyze the pairing data in a way that parametrizes an unknown distribution which can then be used to make inferences on the behavior of speaker loudness settings of a broadcasting device.

For devices calibrated in the lab, the broadcasting device volume indices can be configured at the server and for all other broadcasting devices a conservative default volume setting, for example 75% of the broadcasting device's full range, can be configured which reduces the risk of annoyable volume levels to a user.

The technology disclosed herein performs analysis at a server using data collected by the broadcasting device and the receiving device(s) during pairing broadcasts. In some embodiments, the parameters collected from the broadcasting device and reported to the server can include the broadcasting device model, the broadcast token, current volume index, maximum volume index. From the receiving device(s), the receiving device model, decoded tokens, and a measure of received signal strength/quality can be collected and then reported to the server. For some Direct Sequence Spread Spectrum (DSSS) audio modulation implementations the signal score represents the degree of correlation of the received signal with the known code sequence in the DSSS communication scheme. For other audio modulations similar received signal characteristics can be used, several examples of which are discussed below.

The technology groups reported parameters for successful pairings for each broadcasting device group. For example, in a successful pairing a receiving device can identify the broadcasting device. In some such embodiments the grouped pairing data for can be for each successfully decoded token and the corresponding broadcasting devices of a given group matching the currently configured volume index and over a time window (for example, from present time to the last time volume index was changed at the server). In some embodiments of the technology, only those broadcasting devices that are in the same broadcasting device group, have a statistically significant number of successful pairings, and have a minimum diversity among paired receiving device groups are included for analysis.

In some embodiments, for each broadcasting device, a single token success rate is calculated across all receiving devices and pairing broadcasts and used as a gating function for entering the broadcaster volume adjustment techniques described herein. Each correctly decoded token is considered a success, and tokens with parity or error correction failure are marked as failure. For each broadcasting device in a group with common audio channel broadcast characteristics (for example, the same model mobile phone), a signal quality measure corresponding to received tokens can be used to generate a density distribution. A value of the signal quality measure in the density distribution corresponding to a predetermined percentile, for example the 90th percentile, can be compared with a known signal quality measure, for example, one predetermined under lab conditions or one selected as a desired quality. The difference can be used to adjust the volume index of the broadcasting devices in the group, for example, on a scale that is common in Android and iOS devices.

The very success of a pairing is evidence that the two devices, one broadcasting device and one receiving device, were within the working radius of the communication scheme while tokens were being received. In some cases, with sufficiently large number of successful transactions and tokens, the signal quality measure values can become normally distributed. Where there is sufficient receiving device diversity, it is more likely that no one single receiving device or receiving device group dominates the distribution. Through empirical observation, the 90th percentile value of signal quality represents a desirable combination of orientation, proximity, and receiver gain across many receivers, and can thus be used as a metric for calibration across all broadcasters in the group. Note that selecting a percentile value allows the technology disclosed herein to be independent of the distribution type that best models the actual distribution of signal quality values.

By using and relying on the methods and systems described herein, the technology can control the audio broadcasting volume of a group of broadcasting devices with respect to audio channel pairing with receiving devices. As such, the systems and methods described herein may be employed to establish more reliable communication channels between electronic devices for purposes such as exchanging data and controlling access to resources, and can reduce the likelihood that the pairing audio is annoying or distracting to users. Hence, even without radio frequency pairing between a broadcasting device and a receiving device, such devices can communicate.

Turning now to the drawings, in which like numerals represent like (but not necessarily identical) elements throughout the figures, examples of the present technology are described in detail.

Example System Architectures

FIG. 1 is a block diagram depicting an example operating environment 100 in accordance with certain examples of the technology disclosed herein. While each server, system, and device shown in the operating environment is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the example operating environment 100 includes computing devices 110, 120, and 140. Each of devices 110, 120, and 140 may be configured to communicate with one another via communications network 99—though such a link for either of devices 110 and 120 typically is a mediated RF link, and not typically a peer-to-peer a link. Further, such link may be intermittent when it exists. In some examples, a user associated with a device must install an application and/or make a feature selection to obtain the benefits of the technology described herein. For example, the broadcasting device user and the receiving device user install a mobile payments application used to gather information reported by the respective device as described below.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system, that facilitates the RF communication of signals, data, and/or messages. Throughout the discussion of examples, it should be understood that the terms "data" and "information" are used interchangeably herein to refer to text, images, audio, video, or any other form of information that can exist in a computer-based environment.

Each computing device 110, 120, and 140 can include a communication module capable of transmitting and receiving data over the network 99. For example, each computing device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

In examples described herein computing device 110 is a point of sale (POS) device (including, in some examples, a merchant's mobile phone acting as a POS device) lacking peer-to-peer RF communications subsystems. However, examples of the technology described herein provide utility regardless of the availability of other networked and peer-to-peer RF communications capability of the computing device 110.

In examples described herein, computing device 120 is a mobile phone lacking peer-to-peer RF communications subsystem. However, examples of the technology described herein provide utility regardless of the availability of other networked and peer-to-peer RF communications capability of the computing device 120.

In examples described herein, communications link 130 is a sound-based peer-to-peer communications link; and computing device 110 and computing device 120 each includes a speaker output (110a and 120a respectively) and a microphone input (110b and 120b, respectively) used in communications link 130. "Sound" as used herein includes any vibration that typically propagates as a wave of pressure through air, and is not limited to sound frequencies audible by the human ear. Examples of the technology described herein operate over the frequency response ranges of speakers and microphones of computing devices 110 and 120.

The connections illustrated are examples, and other means of establishing a communications link between the computers and devices can be used. Moreover, those having ordinary skill in the art having the benefit of the present disclosure will appreciate that the computing devices illustrated in FIG. 1 may have any of several other suitable computer system configurations. For example, computing device 110 may be embodied as a mobile phone or handheld computer and may not include all the components described above.

Figure 3:
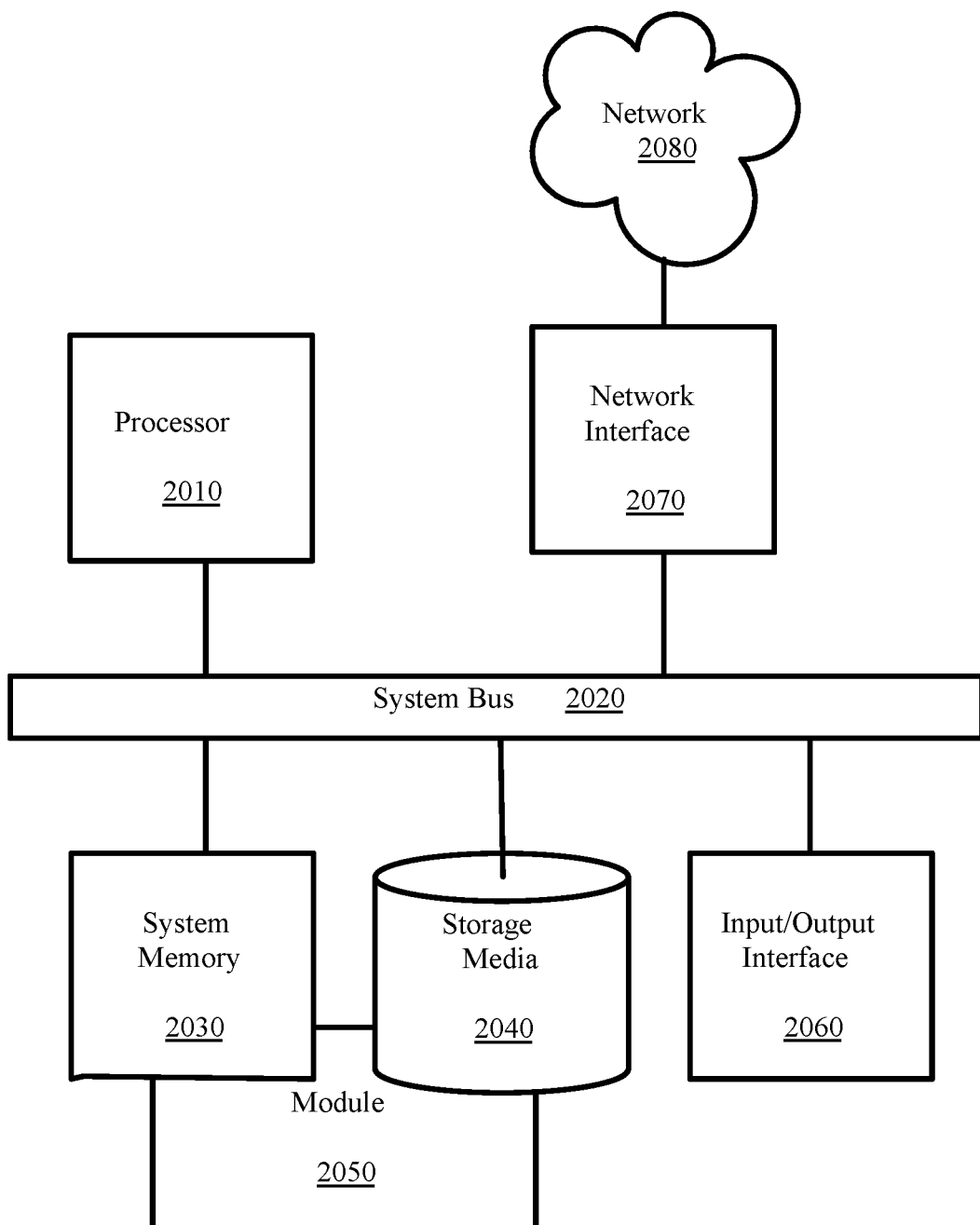
FIG. 3 is a block diagram depicting a computing machine and a module, in accordance with certain examples.

In examples, the computing devices 110, 120, 140, and any other computing machines associated with the technology presented herein, may be any type of computing machine such as, but not limited to, those discussed in more detail with respect to FIG. 3. Furthermore, any modules associated with any of these computing machines, such as modules described herein or any other modules (scripts, web content, software, firmware, or hardware) associated with the technology presented herein may be any of the modules discussed in more detail with respect to FIG. 3. The computing machines discussed herein may communicate with one another as well as other computer machines or communication systems over one or more networks, such as network 99. The network 99 may include any type of data or communications network, including any of the network technology discussed with respect to FIG. 3.

Example Processes

The example methods illustrated in the figures are described hereinafter with respect to the components of the example operating environment 100 according to FIG. 1. The example methods also can be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 2, and continuing to refer to FIG. 1 for context, methods 200 to configure electronic devices for audio frequency pairing are illustrated in accordance with certain examples. In such methods 200, for each of a plurality of audio frequency pairing broadcasts from each of a plurality of broadcasting electronic devices, receiving by a server, as a report from the broadcasting device, pairing broadcast data—Block 210. In some embodiments, the reported pairing broadcast data includes at least an indication of a broadcasting device group to which the broadcasting device belongs and one or more data elements included in the pairing broadcast.

In a continuing example, broadcasting device 110 is a merchant point of sale (POS) device with intermittent access to communications network 99, and the server 140 receives the report from the broadcasting device 110 over a communications network such as communications network 99 when that network 99 is available to the broadcasting device 110. In addition to the device model (broadcasting device group), broadcasting device 110 reports a broadcast token (a data element included in the pairing broadcast), a temporal indication of the pairing broadcast, and an indication of a volume setting of the broadcasting device 110 during the pairing broadcast. In some embodiments of the technology disclosed herein, the server 140 already knows certain characteristics of the broadcast, for example, the token being broadcast. In such examples, it is not necessary for broadcasting device 110 to report known pairing broadcast characteristics to the server 140. In some embodiments, the server 140 receives reports from broadcasting devices 110 individually (in real time, near real time, or delayed) or in batches.

The broadcasting device group can be any group with sufficiently common broadcasting characteristics that a uniform volume setting across the group will produce an acceptably reliable rate of successful pairings for the group. For example, the broadcasting device 110 group can be all devices from a certain manufacturer where the manufacturer's devices exhibit substantially the same speaker characteristics and broadcast audio volume control. As another example, the broadcasting device group can be all devices of a certain model—as is the case in the continuing example. As another example, the broadcasting device group can be all devices with a common version of the device operating system. In the continuing example, a "successful pairing" results when a receiving device 120 correctly determines the broadcast data element.

The broadcast token includes a data payload, for example, each of six positions holding a symbol from a set of L symbols. For example, each position in the data payload can use four bits to encode one of L=16 symbols. Another two positions of symbols from the set of sixteen are used as a parity check. For example, the parity check symbols can be chosen so that the modulo L sum of all symbols in the token equals zero. The data encoded by the six positions is at least loosely coupled to the identity of the broadcasting device 110, which can correspond to the merchant's identity in the system—hence the "successful pairing" results in a receiving device 120 correctly identifying a data element, which maps to the broadcasting device 110—which maps to the merchant identity. In another example, the set of symbols of can be an orthogonal set of sinusoids of different frequencies. In some embodiments, broadcasting device 110 group in determinable from the data payload of the token, and need not be reported to the server separately.

In the continuing example, the same token is broadcast repeatedly from a start time to a stop time during each broadcast. As such, the broadcasting device 110 can report the start time and the stop time, or any single time (for broadcasts of a duration known to the server, for example, start time only, stop time only, midpoint time only). One objective of the broadcasting device 110 reporting a temporal indication to the server 140 is to assist, in some embodiments, in later matching received pairing data with pairing broadcast data for the same pairing broadcast. Where other means of matching received pairing data with pairing broadcast data for the same pairing broadcast are available, the broadcasting device need not report the temporal indication. In some embodiments, the token used by each broadcasting device 110 is reissued on a periodic basis. In such embodiments, if the tokens are reissued on a short period, for example, every five minutes, it is less important that token reception start and stop times be reported.

In the continuing example, the indication of a volume setting of the broadcasting device 110 for the pairing broadcast can be the current volume setting of the broadcasting device 110 speaker. For example, in some broadcasting devices, the audio volume setting is controllable across a 0-130 dB sound pressure level (SPL) index that is also mapped to discrete levels—for example every 10 dB SPL. The broadcasting device 110 volume setting can also be express as dB Full Scale (FS), based on the total range of settings available in the device. In such examples, and of the index value in dB SPL, level, or dB FS can be reported.

One objective of the broadcasting device 110 reporting the volume setting of the broadcasting device 110 for the pairing broadcast is to determine if sufficient range is available for a proposed change to the broadcasting device 110 volume setting. Where other means of determining if sufficient range is available for a proposed change to the broadcasting device 110 volume setting (or where that is not a factor), the broadcasting device need not report the indication of a volume setting of the broadcasting device 110 for the pairing broadcast. Another objective of the broadcasting device 110 reporting the volume setting of the broadcasting device 110 for the pairing broadcast is to gather data on broadcasting devices of the group that are at the same volume setting—allowing for a more tightly-characterized broadcasting device group and resulting in better volume control across all groups. Where other means of determining uniform current volume setting across broadcasting devices 110 in the group are available (or where that is not a factor), the broadcasting device need not report its current volume setting.

In each case, the pairing data reported from the broadcasting device 110 is chosen so that, in combination with pairing data reported from a receiving device 120 and data otherwise known to the server 140, an instance of received pairing data can be matched with an instance of broadcasted pairing data for the same broadcast. Table 1 illustrates notional broadcasted pairing data reported by various broadcasting devices 110 in the continuing example.

TABLE 1

| $Index_{Bx}$ | Bx Group ID | Bx'd Token (hex - w/o parity) | $Tstart_{Bx}$ (hh:mm:ss.ms) | $Tstop_{Bx}$ (hh:mm:ss.ms) | Volume Setting (dB FS) |
|---|---|---|---|---|---|
| 1 | Paxel 3 | 65E676 | 12:01:01.054 | 12:01:01.062 | 40 |
| 2 | jPhone 6 | A98661 | 12:02:03.125 | 12:02:03.133 | 30 |
| 3 | Paxel 3 | A4AE98 | 12:02:04.768 | 12:02:04.776 | 40 |
| ... | ... | ... | ... | ... | ... |
| 10,000 | Paxel 3 | 65E676 | 12:01:01.020 | 12:01:01.028 | 20 |

For each reception of each audio frequency pairing broadcast at a receiving electronic device, the server receives, as a report from the receiving device, received pairing data—

Block 220. In the continuing example, each of a plurality of receiving devices 120 receiving the pairing broadcast reports, to the server, an indication of a receiving device group to which the reporting receiving device 120 belongs, the received data element, an indication of received signal quality, and a temporal indication of the pairing broadcast reception.

In the continuing example, receiving device 120 is a customer's mobile phone with intermittent access to communications network 99, and the server 140 receives the report from the receiving device 120 over a communications network such as communications network 99 when that network 99 is available to the receiving device 120. In some embodiments of the technology disclosed herein, the server 140 already knows certain characteristics of the received broadcast. In such examples, it is not necessary for receiving device 120 to report known received characteristics to the server 140. In some embodiments, the server 140 receives reports from receiving devices 120 individually (in real time, near real time, or delayed) or in batches.

The receiving device group can be a group with sufficiently common receiving characteristics. For example, the receiving device 120 group can be all devices from a certain manufacturer where the manufacturer's devices exhibit substantially the same audio reception characteristics. As another example, the receiving device 120 group can be all receiving devices 120 of a certain model—as is the case in the continuing example. As another example, the receiving device 120 group can be all devices with a common version of the device operating system.

In the continuing DSSS example, the received data element is determined by the receiving device 120 by decoding the token symbol-by-symbol after downconverting, despreading, and phase correction as known to those of skill in the art. Other effects may also need to be removed before decoding, for example, if data element was mixed with a pedestal signal before being broadcast, then the pedestal signal is also removed. As another example of other effects to be removed, parity checking and error correction are performed, as known to those of skill in the art, in embodiments employing such strategies.

In the continuing example, the indication of received signal quality is determined by estimating the energy in the token after it is extracted from the received signal, but before it is decoded into symbols (which identify the broadcasting device/merchant). Note that token energy, as received signal quality, is determined for each candidate token in each received instance of a pairing broadcast. Note that token energy is not the same as broadcast volume in dB FS (Full Scale across the range of available broadcast volume settings). As described above, in the continuing example, a single pairing broadcast instance includes repeated broadcasts of the same token. The token energy and decoded token value is reported as a separate record for each received token, therefore a single instance of a received pairing broadcast can result in multiple data points received as a report by the server 140 from the receiving device 120.

While the continuing example reports the token energy, other embodiments of the technology disclosed herein can report other quality/strength characteristics of the received signal. For example, in some embodiments, the receiving device 120 correlates each symbol making up the candidate token with each of its possible outcomes (a manageable task where the symbol library consists of only L possible outcomes and L is a reasonable number, like "16"). In some such embodiments, the distribution of correlations between L possible outcomes and the candidate symbol is normalized and the symbol with the highest normalized correlation signal ("symbol score") is identified as the received symbol. This is done for each symbol in the token (a combination of six symbols). In such embodiments, a composite "signal score" for the token is derived as the average symbol score of the symbols comprising the received token. This approach is taken for each of the received token repeats in a pairing broadcast as an indication of received signal quality. In general, an indication of signal quality can be derived at other points along the demodulation/decoding pipeline and used at later stages of the technology to adjust the broadcast volume of broadcasting device in the same way that token energy is used in the continuing example. As another example of received signal quality in the DSSS case, consider an acquisition score as a function of the correlation between the pseudo-random code c used to spread the token at the broadcasting device 110, and the baseband spread signal (carrier removed) at the receiving device.

In the continuing example, the received broadcast is characterized by a reception start time and a reception stop time as the temporal indication of the pairing broadcast reception. As such, the receiving device 120 can report, and the server 140 can receive, the reception start time and the reception stop time, or any single time (for receptions of a duration known to the server, for example, reception start time only, reception stop time only, reception midpoint time only). In some embodiments, a specific token time is estimated and reported per token, for example, where differences in the time bases for the devices involved are accounted for. One objective of the receiving device 120 reporting a temporal indication to the server is to assist in later matching received pairing data with broadcasted pairing data for the same pairing broadcast. Where other means of matching received pairing data with broadcasted pairing data for the same pairing broadcast are available, the receiving device 120 need not report the temporal indication, for example, where tokens are reissued over a short period and device locations are reported.

TABLE 2

| $Index_{Rx}$ | Rx Group ID | Rx'd Token (hex - w/o parity) | $Tstart_{Bx}$ (hh:mm:ss.ms) | $Tstop_{Bx}$ (hh:mm:ss.ms) | Token Energy (dB) |
|---|---|---|---|---|---|
| 1 | Singsong 1200 | 65E676 | 12:01:01.059 | 12:01:01.061 | 70 |
| 2 | Bokia 105 | 65E676 | 12:01:01.060 | 12:01:01.062 | 100 |
| 3 | Bokia 105 | 65E676 | 12:01:01.064 | 12:01:01.066 | 100 |
| . . . | . . . | . . . | . . . | . . . | . . . |
| 15,000 | Carbon A9 | 65E67E | 12:01:01.025 | 12:01:01.027 | 90 |

In each case, the pairing data reported from the receiving device 120 is chosen so that, in combination with pairing data reported from a broadcasting device 110 and data otherwise known to the server 140, an instance of received pairing data can be matched with an instance of broadcasted pairing data for the same broadcast. Table 2 illustrates notional received pairing data reported by various receiving devices 120 in the continuing example.

The server matches each instance of the reported received pairing data with zero or one instances of the reported pairing broadcast data—Block 230. In the continuing example, the server 140 performs the matching based at least in part on: the temporal indication of the pairing broadcast and the temporal indication of the pairing reception, and at least one of the received/candidate tokens matching the token that was broadcast. Given that not all receiving devices 120 and broadcasting device 110 share a synchronized time, some embodiments do not require time matching. In the continuing example, any overlap between the broadcasting period and the reception period (with a matching token) is acceptable to constitute a match. In other embodiments, even non-overlap between the broadcast period and the reception period is acceptable—within a predetermined difference accounting for propagation delay and a predetermined time variation between receiving devices and broadcast devices. Not all received/candidate tokens will match a broadcast token. However, the technology disclosed herein operates on those broadcast/reception combinations where the received/candidate token matches a broadcast token. It is also possible that a plurality of receiving devices will each properly decode (and report) a data element, such as a token, that was part of a single broadcast from a single receiving device.

In some embodiments, the broadcasting device 110 and the receiving device(s) 120 report device location. In such embodiments, reported device location can be used to determine matches between the broadcasted data element(s) and the received data element(s).

TABLE 3 illustrates notional matches found by the server 140 in 120 in the continuing example.

TABLE 3

| Index$_{Rx}$ | Index$_{Bx}$ | Token Match? (Y/N) | Time Overlap? (Y/N) | R$_x$ Token Energy (dB) | Add to Histogram for Bx Group? (Y/N) |
|---|---|---|---|---|---|
| 1 | 1 | Y | Y | 70 | Y |
| 2 | 1 | Y | Y | 100 | Y |
| ... | ... | ... | ... | ... | ... |
| 25,000 | 10,000 | N | Y | 90 | N |

For each group of broadcasting devices reporting a particular broadcasting device group, the server identifies a received signal quality value corresponding to a predetermined percentile of a density distribution of the received signal quality of instances of received pairing data that have been determined to match an instance of broadcast pairing data—Block 240. In the continuing example, out of 25,000 tokens reported as received across all models of receiving devices 120, 640 were found to match a broadcast token from the 10,000 reported pairing broadcasts (three tokens per broadcast) from those Bokia 105 (a receiving device 120 group) devices broadcasting at a setting of 100 dB FS out of 130 dB FS maximum. Out of the 640 matches, 9 matches were distributed across three obscure receiving device 120 models, while the remaining 631 matches were distributed across five different receiving device 110 models, each of the five models with at least 100 matched tokens.

In some embodiments of the technology disclosed herein, as in the continuing example, data for a particular group of receiving devices 120 is used to characterize particular broadcasting device 110 group only if a minimum number of matches (100 matches in the case of the continuing example) are found by the server 140. Further, match data for a particular group of broadcasting devices 110 is used only if a minimum amount of receiving device 120 group diversity (at least four different receiving device 120 groups in the case of the continuing example) has been collected. TABLE 4 illustrates the token energy histogram data for the 631 matches found for the Bokia 105 group of broadcasting devices 110. The 90th percentile of the observed matching token energies for the Bokia 105 group of broadcasting devices 110 is 92.8 dB.

TABLE 4

| Token Energy (dB) | Cumulative Matching Token Count | Matching Token Percentile |
|---|---|---|
| 0 | 0 | 0 |
| 10 | 0 | 0 |
| 20 | 0 | 0 |
| 30 | 0 | 0 |
| 40 | 25 | 3.9 |
| 50 | 40 | 10.3 |
| 60 | 69 | 21.2 |
| 70 | 110 | 38.6 |
| 80 | 180 | 67.2 |
| 90 | 127 | 87.3 |
| 100 | 60 | 96.8 |
| 110 | 20 | 100 |
| 120 | 0 | 100 |
| 130 | 0 | 100 |

The server determines, for each broadcast device of the particular group, a volume setting as a function of the received signal quality value corresponding to the predetermined percentile and a reference received signal quality value—Block 250. In the continuing example, the server 140 compares the received signal quality value corresponding to the predetermined percentile to the reference signal quality value. TABLE 5 illustrates the comparison based on the TABLE 4 token energy histogram data for the 631 matches found for the Bokia 105 group of broadcasting devices 110 with the reference values. The 90th percentile of the reference token energies for the Bokia 105 group of broadcasting devices 110 is 106.3 dB—this is a 13.5 dB increase over the observed token energy (106.3 dB—92.89 dB).

TABLE 5

| Token Energy (dB) | Cumulative Matching Token Count | Matching Token Percentile | Cumulative Reference Token Count | Reference Token Percentile |
|---|---|---|---|---|
| 0 | 0 | 0 | 0 | 0 |
| 10 | 0 | 0 | 0 | 0 |
| 20 | 0 | 0 | 0 | 0 |
| 30 | 0 | 0 | 0 | 0 |
| 40 | 25 | 3.9 | 5 | .95 |
| 50 | 40 | 10.3 | 20 | 4.7 |
| 60 | 69 | 21.2 | 29 | 10.3 |
| 70 | 110 | 38.6 | 80 | 25.5 |
| 80 | 180 | 67.2 | 100 | 44.6 |
| 90 | 127 | 87.3 | 150 | 73.2 |
| 100 | 60 | 96.8 | 50 | 82.8 |

TABLE 5-continued

| Token Energy (dB) | Cumulative Matching Token Count | Matching Token Percentile | Cumulative Reference Token Count | Reference Token Percentile |
|---|---|---|---|---|
| 110 | 20 | 100 | 60 | 94.2 |
| 120 | 0 | 100 | 30 | 100 |
| 130 | 0 | 100 | 0 | 100 |

In the continuing example, the dB energy scale of the difference between received signal quality and reference signal quality at the receiving device 110, and the dB FS scale of the broadcasting device 110 volume setting, are not directly transferable. The server 140 determines the dB FS increment for the broadcasting device by first dividing the difference between the dB reference token energy and the dB matching token energy by two to translate the energy measure to an amplitude measure. In the continuing example, the 13.5 dB energy difference corresponds to a 6.25 dB amplitude difference at the receiver. If the broadcasting devices 110 in the particular group characterized by the broadcast pairing data control broadcast volume in dB FS, then this amplitude difference can be used to adjust the broadcast volume.

In the continuing example the FS volume index of the broadcasting device 110 is divided into one hundred steps, as is the case in the continuing example, each step is 0.5 dB—giving a total range of 50 dB. On that scale, the normalized current broadcasting device volume setting is given by 100× the current_volume_setting/max_volume_setting. The change to the current_volume_setting in dB FS is given by the db_amplitude_difference_at_the_receiver/step_size. In the continuing example, the change to the current_volume_setting in dB FS is given by the dB amplitude difference seen at the receiver/step_size=>6.25/0.5 or 12.5 steps—rounded up to 13 steps by which each broadcasting device 110 in the particular group is commanded to increase its volume.

The server 140 transmits instructions to conform the broadcasting device to the determined volume setting to each broadcasting device of the particular group—Block 260. In the continuing example, the server 140 commands each Bokia 105 (not only the ones in the group from TABLE 4) to broadcast at 113.5 dB SPL. In some embodiments, the server 140 commands all Bokia 105 devices that were broadcasting at 100 dB SPL (even those not contributing successful pairing data to TABLE 4) to increase to 113.5 dB SPL. In some embodiments, the server commands all Bokia 105 devices to broadcast at 113.5 dB SPL regardless of the broadcasting device's 110 current setting. In each embodiment, each broadcasting device 110 receiving the command conforms its broadcast setting to the command.

Example Computer Program Products

A computer program product comprises a non-transitory computer-readable storage device having computer-executable program instructions embodied thereon that when executed by a computer cause the computer to configure electronic devices for audio frequency pairing, the computer-executable program instructions comprising computer-executable program instructions to execute an example method described hereinbefore.

Other Examples

FIG. 3 depicts a computing machine 2000 and a module 2050 in accordance with certain examples. The computing machine 2000 may correspond to any of the various computers, servers, mobile devices, embedded systems, computing devices, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. For example, network 2080 may be the network 99 according to FIG. 1. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

The present technology may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the present technology in computer programming, and the examples should not be construed as limited to any one set of computer program instructions. Further, a skilled programmer would be able to write such a computer program to implement the present technology as described herein based on the appended flow charts and associated description in the application text. Therefore, disclosure of a particular set of program code instructions is not considered necessary for an adequate understanding of how to make and use the technology described herein. Further, those skilled in the art will appreciate that one or more aspects of the technology described herein may be performed by hardware, software, or a combination thereof, as may be embodied in one or more computing systems. Moreover, any reference to an act being performed by a computer should not be construed as being performed by a single computer as more than one computer may perform the act.

The technology described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples.

Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of technology described herein defined in the following claims, the scope of which is to be accorded the broadest interpretation so as to encompass such modifications and equivalent structures.

What is claimed is:

1. A computer-implemented method to configure electronic devices for audio frequency pairing, comprising:
   for each of a plurality of audio frequency pairing broadcasts from a broadcasting electronic device, receiving as a report from the broadcasting device, pairing broadcast data comprising: an indication of a broadcasting device group to which the reporting broadcasting device belongs, a data element included in the pairing broadcast, and an indication of a volume setting of the broadcasting device;
   for each reception of each audio frequency pairing broadcast at a receiving electronic device, receiving as a report from each receiving device, received pairing data comprising: an indication of a receiving device group to which the reporting receiving device belongs, the received data element, and an indication of received signal quality;
   matching each instance of the reported received pairing data with zero or one instances of the reported pairing broadcast data based at least in part on at least one received data element matching the data element included in a pairing broadcast;
   for each particular broadcasting device group having a common indication of volume setting, identifying a received signal quality value corresponding to a predetermined percentile of a density distribution of the received signal quality of instances of received pairing data that have been determined to match an instance of broadcast pairing data;
   determining, for each broadcast device of the particular group, a volume setting as a function of: the received signal quality value corresponding to the predetermined percentile and a reference received signal quality value; and
   transmitting to each broadcasting device of the particular group, instructions to conform the broadcasting device to the determined volume setting.

2. The method of claim 1 wherein:
   pairing broadcast data further includes a temporal indication of the broadcast comprising a broadcast start time and a broadcast stop time;
   received pairing data further includes a temporal indication of the broadcast reception;
   the data element is a token encoding a plurality of symbols and broadcast repeatedly from the broadcast start time to the broadcast stop time;
   determining a volume setting is further a function of the temporal indication of the broadcast and the temporal indication of the broadcast reception; and
   the predetermined percentile of the density distribution is 90%.

3. The computer-implemented method of claim 1 wherein the broadcasting device group is at least one of: the broadcasting device model, the broadcasting device operating system, the broadcasting device manufacturer.

4. The computer-implemented method of claim 1 wherein reporting pairing data comprises logging pairing data for a plurality of pairings and transmitting the logged pairing data.

5. The computer-implemented method of claim 1 wherein determining the volume setting for each broadcast device characterized by the particular indication comprises determining a change in the volume setting as a percentage corresponding to the percentage difference between the received signal quality value of the predetermined percentile and the reference received signal quality value.

6. The computer-implemented method of claim 1 wherein the density distribution comprises a first predetermined minimum number of instances of received pairing data from each of a second predetermined minimum number of receiving device groups.

7. The computer-implemented method of claim 1 further comprising setting, by each broadcasting device receiving the instructions, the broadcast volume index the broadcasting device to conform to the instructions.

8. One or more non-transitory computer-readable media that store instructions that when executed by one or more processors cause the one or more processors to perform operations, the operations comprising:
   receiving, for each of a plurality of audio frequency pairing broadcasts from a broadcasting electronic device and as a report from the broadcasting device, pairing broadcast data comprising: an indication of a broadcasting device group to which the reporting broadcasting device belongs, a data element included in the pairing broadcast, and an indication of a volume setting of the broadcasting device;
   receiving, for each reception of each audio frequency pairing broadcast at a receiving electronic device and as a report from each receiving device, received pairing data comprising: an indication of a receiving device group to which the reporting receiving device belongs, the received data element, and an indication of received signal quality;
   matching each instance of the reported received pairing data with zero or one instances of the reported pairing broadcast data based at least in part on at least one received data element matching the data element included in a pairing broadcast;
   identifying, for each particular broadcasting device group having a common indication of volume setting, a received signal quality value corresponding to a predetermined percentile of a density distribution of the received signal quality of instances of received pairing data that have been determined to match an instance of broadcast pairing data;

determining, for each broadcast device of the particular group, a volume setting as a function of: the received signal quality value corresponding to the predetermined percentile and a reference received signal quality value; and transmitting to each broadcasting device of the particular group, instructions to conform the broadcasting device to the determined volume setting.

9. The one or more non-transitory computer-readable media of claim 8 wherein:

pairing broadcast data further includes a temporal indication of the broadcast comprising a broadcast start time and a broadcast stop time;

received pairing data further includes a temporal indication of the broadcast reception;

the data element is a token encoding a plurality of symbols and broadcast repeatedly from the broadcast start time to the broadcast stop time;

determining a volume setting is further a function of the temporal indication of the broadcast and the temporal indication of the broadcast reception; and the predetermined percentile of the density distribution is 90%.

10. The one or more non-transitory computer-readable media of claim 8 wherein the broadcasting device group is at least one of: the broadcasting device model, the broadcasting device operating system, the broadcasting device manufacturer.

11. The one or more non-transitory computer-readable media of claim 8 wherein reported pairing data comprises receiving pair data that has been logged at the source and reported in batches.

12. The one or more non-transitory computer-readable media of claim 8 wherein determining the volume setting for each broadcast device characterized by the particular indication comprises:

determining a change in the volume setting as a percentage corresponding to the percentage difference between the received signal quality value of the predetermined percentile and the reference received signal quality value.

13. The one or more non-transitory computer-readable media of claim 8 wherein the density distribution comprises a first predetermined minimum number of instances of received pairing data from each of a second predetermined minimum number of receiving device groups.

14. The one or more non-transitory computer-readable media of claim 8 wherein the instructions further comprise instructions to set, by each broadcasting device receiving the instructions, the broadcast volume index the broadcasting device to conform to the instructions.

15. A system to configure electronic devices for audio frequency pairing, the system comprising:

one or more processors; and one or more non-transitory computer-readable media that store instructions that when executed by the one or more processors cause the one or more processors to perform operations, the operations comprising:

receiving, for each of a plurality of audio frequency pairing broadcasts from a broadcasting electronic device and as a report from the broadcasting device, pairing broadcast data comprising: an indication of a broadcasting device group to which the reporting broadcasting device belongs, a data element included in the pairing broadcast, and an indication of a volume setting of the broadcasting device;

receiving, for each reception of each audio frequency pairing broadcast at a receiving electronic device and as a report from each receiving device, received pairing data comprising: an indication of a receiving device group to which the reporting receiving device belongs, the received data element, and an indication of received signal quality;

matching each instance of the reported received pairing data with zero or one instances of the reported pairing broadcast data based at least in part on at least one received data element matching the data element included in a pairing broadcast;

identifying, for each particular broadcasting device group having a common indication of volume setting, a received signal quality value corresponding to a predetermined percentile of a density distribution of the received signal quality of instances of received pairing data that have been determined to match an instance of broadcast pairing data;

determining, for each broadcast device of the particular group, a volume setting as a function of: the received signal quality value corresponding to the predetermined percentile and a reference received signal quality value; and transmitting to each broadcasting device of the particular group, instructions to conform the broadcasting device to the determined volume setting.

16. The system of claim 15 wherein:

pairing broadcast data further includes a temporal indication of the broadcast comprising a broadcast start time and a broadcast stop time;

received pairing data further includes a temporal indication of the broadcast reception;

the data element is a token encoding a plurality of symbols and broadcast repeatedly from the broadcast start time to the broadcast stop time;

determining a volume setting is further a function of the temporal indication of the broadcast and the temporal indication of the broadcast reception; and the predetermined percentile of the density distribution is 90%.

17. The system of claim 15 wherein the broadcasting device group is at least one of: the broadcasting device model, the broadcasting device operating system, the broadcasting device manufacturer.

18. The system of claim 15 wherein receiving pairing data comprises receiving pair data that has been logged at the source and reported in batches.

19. The system of claim 15 wherein determining the volume setting for each broadcast device characterized by the particular indication comprises:

determining a change in the volume setting as a percentage corresponding to the percentage difference between the received signal score value of the predetermined percentile and the reference received signal strength value.

20. The system of claim 15 wherein the density distribution comprises a first predetermined minimum number of instances of received pairing data from each of a second predetermined minimum number of receiving device groups.

* * * * *